United States Patent
Choi et al.

(10) Patent No.: US 10,447,421 B2
(45) Date of Patent: Oct. 15, 2019

(54) FRONTHAUL CONTROL DEVICE AND OPERATING METHOD OF FRONTHAUL CONTROL DEVICE, PROGRAM FOR CONTROLLING ALLOCATION OF OPTICAL WAVELENGTH BAND, AND COMPUTER-READABLE RECORDING MEDIUM ONTO WHICH PROGRAM IS RECORDED

(71) Applicant: SK TELECOM CO., LTD., Seoul (KR)

(72) Inventors: Chang Soon Choi, Seoul (KR); Min Soo Na, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/753,903

(22) PCT Filed: May 13, 2016

(86) PCT No.: PCT/KR2016/005079
§ 371 (c)(1),
(2) Date: Feb. 20, 2018

(87) PCT Pub. No.: WO2017/039115
PCT Pub. Date: Mar. 9, 2017

(65) Prior Publication Data
US 2018/0254846 A1    Sep. 6, 2018

(30) Foreign Application Priority Data
Aug. 28, 2015    (KR) .................. 10-2015-0121726

(51) Int. Cl.
*H04J 14/02*    (2006.01)
*H04J 3/14*    (2006.01)

(52) U.S. Cl.
CPC ............ *H04J 14/0257* (2013.01); *H04J 3/14* (2013.01); *H04J 14/0238* (2013.01); *H04J 2203/0069* (2013.01)

(58) Field of Classification Search
CPC ...... H04J 14/0257; H04J 3/14; H04J 14/0238; H04J 14/02; H04J 2203/0069
See application file for complete search history.

(56) References Cited

U.S. PATENT DOCUMENTS

| | | | |
|---|---|---|---|
| 6,757,251 B1 * | 6/2004 | Nakaishi | H04L 47/29 370/236.2 |
| 2013/0078925 A1 * | 3/2013 | Aguirre | H04W 4/021 455/62 |

(Continued)

FOREIGN PATENT DOCUMENTS

| | | |
|---|---|---|
| JP | 2006-345069 A | 12/2006 |
| JP | 2008-42525 A | 2/2008 |

(Continued)

OTHER PUBLICATIONS

The International Search Report for PCT/KR2016/005079 dated Jul. 5, 2016, citing the above references.

(Continued)

*Primary Examiner* — Leslie C Pascal
(74) *Attorney, Agent, or Firm* — Hauptman Ham, LLP

(57) ABSTRACT

The present disclosure provides a fronthaul control device which can adjust a center wavelength of an optical signal to changeably control allocation of an optical wavelength band; an operating method of the fronthaul control device; a program for controlling allocation of an optical wavelength band; and a computer-readable recording medium in which the program is recorded.

9 Claims, 6 Drawing Sheets

(56) References Cited

U.S. PATENT DOCUMENTS

2015/0244493 A1    8/2015  Cugini et al.
2015/0349891 A1*  12/2015  Jung ................ H04B 10/25754
                                                          398/68

FOREIGN PATENT DOCUMENTS

JP      2011-172133 A     9/2011
JP      2011-199369 A    10/2011
KR   10-2013-0113112 A   10/2013

OTHER PUBLICATIONS

Zhang et al., "A Survey on OFDM-Based Elastic Core Optical Networking", IEEE Communications Surveys & Tutorials, vol. 15, No. 1, First Quarter 2013, p. 65-87.
Kani et al., "Options for future mobile backhaul and fronthaul", Optical Fiber Technology 26 (2015), p. 42-49.
European search report dated Mar. 27, 2019 for corresponding the international application No. PCT/KR2016/005079.

* cited by examiner (A)    (B)

FRONTHAUL CONTROL DEVICE AND OPERATING METHOD OF FRONTHAUL CONTROL DEVICE, PROGRAM FOR CONTROLLING ALLOCATION OF OPTICAL WAVELENGTH BAND, AND COMPUTER-READABLE RECORDING MEDIUM ONTO WHICH PROGRAM IS RECORDED

BACKGROUND OF THE INVENTION

1. Field of the Invention

The present disclosure relates to a technology for controlling allocation of an optical wavelength band. More specifically, the present disclosure relates to a fronthaul control device which can adjust a center wavelength of an optical signal to changeably control allocation of an optical wavelength band, and an operation method of the fronthaul control device.

2. Description of the Prior Art

Recently, according to the evolution (for example, LIE-A to 5G) of a wireless network, a wide bandwidth and a Multiple Input and Multiple Output (MIMO) technology has been introduced into a fronthaul for connecting a DU and RU.

However, when a wide bandwidth and a Multiple Input and Multiple Output (MIMO) technology are introduced in a fronthaul, the capacity of the fronthaul is limited. The capacity of the fronthaul may be determined in proportion to a bandwidth and the number of antennas.

In order to solve a problem of fronthaul capacity limitation, a fronthaul is implemented on the basis of Wavelength Division Multiplexing (WDM).

The fronthaul implemented on the basis of WDM is a Point-to-Multipoint (P2MP) fronthaul connecting a plurality of RUs with one DU by applying a WDM technology for dividing and transmitting through a plurality of wavelengths in optical communications to the fronthaul.

Meanwhile, a WDM-based fronthaul operates in a state where a center wavelength of the optical signal is fixed in order to standardize an optical transmitter/receiver and a multiplexer that gathers/divides a plurality of optical signals.

Accordingly, the number of optical wavelength bands which can be actually utilized in a fronthaul may be limited.

The present disclosure proposes a method by which allocation of an optical wavelength band can be changeably controlled by flexibly adjusting a center wavelength of an optical signal.

SUMMARY OF THE INVENTION

An aspect to be achieved in the present disclosure is to provide a fronthaul control device which can adjust a center wavelength of an optical signal to changeably control allocation of an optical wavelength band, and an operation method of the fronthaul control device.

According to an embodiment of the present disclosure, a fronthaul control device of the present disclosure includes a bandwidth identification unit configured to identify a frequency bandwidth of a particular cell among a plurality of cells according to an optical wavelength data rate required for the particular cell; a center wavelength determination unit configured to determine a center wavelength for allocating the frequency bandwidth of the particular cell; and an optical wavelength band allocation unit configured to allocate an optical wavelength band to the particular cell on the basis of the center wavelength and the frequency bandwidth of the particular cell, wherein the center wavelength is determined such that the optical wavelength band allocated to the particular cell is adjacent to an optical wavelength band allocated to at least one of the other cells other than the particular cell among the plurality of cells.

Particularly, the bandwidth identification unit may be configured to identify that the frequency bandwidth of the particular cell becomes narrow when the particular cell is off or when at least one of a plurality of antennas related to the particular cell is off.

Particularly, the center wavelength determination unit may be configured to determine a center wavelength such that the optical wavelength band to be allocated to the particular cell is included in an optical wavelength band allowing use of an optical amplifier, when a distance between the particular cell and a toll center is equal to or greater than a predetermined value.

According to another embodiment of the present disclosure, a computer-readable recording medium according to the present disclosure includes a command to perform: identifying a frequency bandwidth of a particular cell among a plurality of cells according to an optical wavelength data rate required for the particular cell; determining a center wavelength for allocating the frequency bandwidth of the particular cell; and allocating an optical wavelength band to the particular cell on the basis of the center wavelength and the frequency bandwidth of the particular cell, wherein the center wavelength is determined such that an optical wavelength band allocated to the particular cell is adjacent to the optical wavelength band allocated to at least one of the other cells other than the particular cell among the plurality of cells.

Particularly, the identifying may include identifying that the frequency bandwidth of the particular cell becomes narrow when the particular cell is off or when at least one of a plurality of antennas related to the particular cell is off.

Particularly, the determining may include determining the center wavelength such that the optical wavelength band to be allocated to the particular cell is included in an optical wavelength band allowing use of an optical amplifier, when a distance between the particular cell and a toll center is equal to or greater than a predetermined value.

According to the present disclosure, allocation of an optical wavelength band is changeably controlled by flexibly adjusting a center wavelength of an optical signal. Therefore, the present disclosure can solve a problem that the number of optical wavelength bands which can be utilized in a fronthaul is limited.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, various embodiments of the present disclosure will be described with reference to the accompanying drawings.

First of all, a communication environment to which the present disclosure is applied will be described with reference to FIG. 1.

Figure 1:
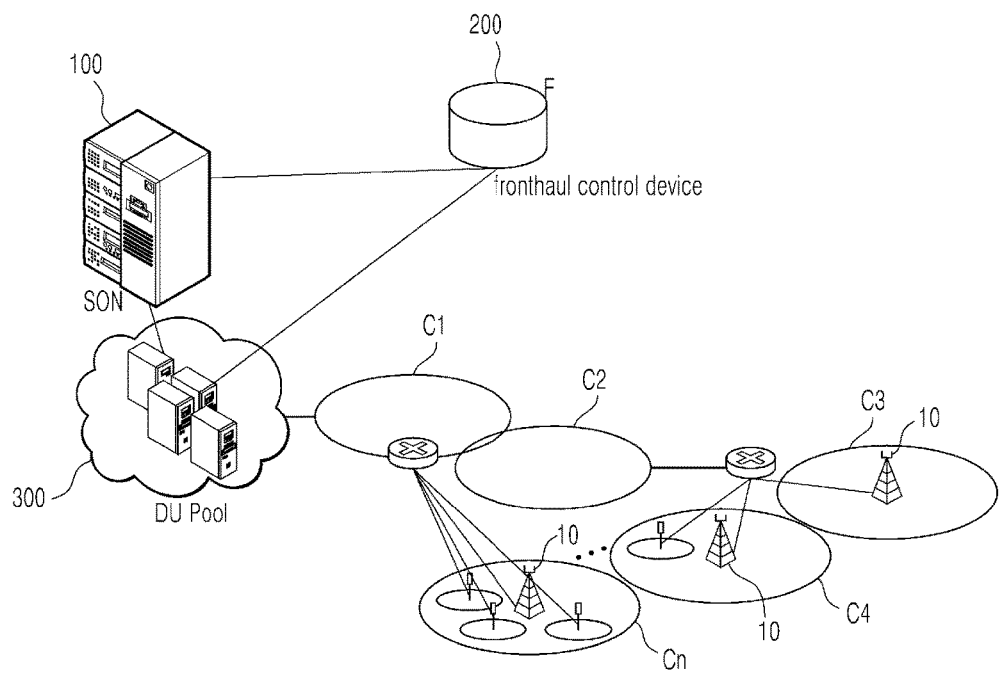
FIG. 1 is an exemplary diagram showing a communication environment to which the present disclosure is applied.
Figure 1:
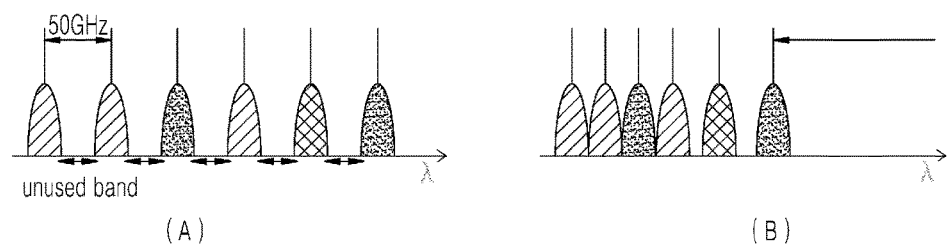

As illustrated in FIG. 1, a communication environment to which the present disclosure is applied has a flexible fronthaul (hereinafter, a fronthaul) structure for implementing a Dynamic Cellular Network that dynamically adjusts the capacity of a cellular network depending on the traffic generated in the cellular network.

The communication environment to which the present disclosure is applied includes a plurality of cells C1-Cn including at least one base station 10, a self-diagnosing network device 100 (a Self-Organizing Network, hereinafter, a SON) configured to integrally control the plurality of cells C1-Cn, and a fronthaul control device 200 configured to changeably allocate optical wavelength bands of the plurality of cells C1-Cn in interworking with the SON 100.

The base station 10 may be divided into a Digital Unit (DU) and a remote Radio Unit (RU). That is, the RU is arranged in each base station, and the DU is concentrated in a virtualized environment to be implemented in a DU toll center 300 (DU pool).

In the communication environment of the present disclosure as described above, a fronthaul is a wired optical link connecting a DU and a RU, and a fronthaul optical signal (hereinafter, an optical signal) is transmitted between the DU and the RU through the optical link.

A conventional fronthaul is designed on an assumption that a data rate for transmission from a DU to a RU is constant, when an optical signal is transmitted through the fronthaul. Therefore, an optical wavelength band is allocated to each cell with a center wavelength of the optical signal being fixed as illustrated in (A) of FIG. 1.

Accordingly, a conventional fronthaul has a problem that the number of optical wavelength bands which can be actually utilized in the fronthaul is limited.

However, a fronthaul according to the present disclosure changeably controls an optical wavelength band allocated to each cell by adjusting a center wavelength of an optical signal transmitted from a DU to a RU, as illustrated in (B) of FIG. 1. Therefore, a bandwidth is saved, and thus the number of actually utilizable optical wavelength bands can be increased.

Hereinafter, a method proposed in the present disclosure will be described in more detail.

Referring FIG. 1, the SON 100 according to an embodiment of the present disclosure integrally manages cell coverage and state of a plurality of cells C1-Cn included in a fronthaul structure.

Particularly, when at least one cell which is off among the plurality of cells C1-Cn, or a cell including a base station having at least some antennas which are off among antennas of the base station is identified (hereinafter, the identified cell is referred to as "a particular cell"), the SON 100 receives off-level information of the particular cell from the DU pool 300.

When the SON 100 receives off-level information from the DU pool 300, the SON 100 calculates a frequency bandwidth of the particular cell according to an optical wavelength data rate required for the particular cell included in the off-level information.

The off-level information may be defined as information minimally required for calculating a frequency bandwidth in an off-state, in order to determine an optical wavelength data rate required for a particular cell. For example, the off-level information may include information about whether a control signal which should be transmitted to the particular cell exists, information about whether a minimum data transmission is continuously required, or the like.

Then, the SON 100 transfers a frequency bandwidth of the particular cell to the fronthaul control device 200.

Meanwhile, the above description includes that the SON 100 directly calculates a frequency bandwidth of the particular cell and then transfers the calculated frequency bandwidth. However, the SON 100 may transfer an optical wavelength data rate required for a particular cell included in off-level information to the fronthaul control device 200. Then the fronthaul control device 200 may calculate a frequency bandwidth of the particular cell.

The DU pool 300 determines a particular cell by monitoring an activation state of a terminal included in the plurality of cells C1-Cn or an activation state of an antenna of a base station.

More specifically, the DU pool 300 monitors an activation state of terminals included in the plurality of cells C1-Cn and then determines whether each cell C1-Cn is ON or OFF.

Meanwhile, in the above description, the DU pool 300 performs a function of monitoring an activation state of terminals included in the plurality of cells and then determining whether each cell is ON or OFF. However, the present disclosure is not limited thereto. The SON 100 also may equally perform said function.

When there is a cell with an activated terminal being equal to or smaller than a predetermined off-state determination threshold value among the plurality of cells C1-Cn, the DU pool 300 determines the cell to be an off-state cell, and then determines the off-state cell as a particular cell.

For example, when an activation terminal among terminals included in the cell C2 is equal to or smaller than an off-state determination threshold value, the DU pool 300 determines the cell C2 to be in an off state, and then determines the off-state cell C2 as a particular cell.

Also, the DU pool 300 monitors an activation state of an antenna of base stations included in the plurality of cells C1-Cn and then determines whether each cell C1-Cn is ON or OFF. The antenna included in a base station is a Multiple Input and Multiple Output (MIMO) RF unit, and may include a plurality of antennas.

When some antennas among antennas of base stations included in the plurality of cells C1-Cn are determined to be in an off state, the DU pool 300 determines a cell including the off-state antenna, as a particular cell.

For example, when some antennas among antennas of a base station included in the cell C2 is equal to or smaller than a predetermined off-state determination threshold value, the DU pool 300 determines the cell C2 including some off-state antennas to be in an off state, and then determines the off-state cell C2, as a particular cell.

Then, when determination of a particular cell is completed, the DU pool 300 generates off-level information on the particular cell in order to determine an optical wavelength data rate required for the particular cell, and then provides the information when the information is requested.

Hereinafter, a configuration of a fronthaul control device according to an embodiment of the present disclosure will be described in detail.

Figure 2:
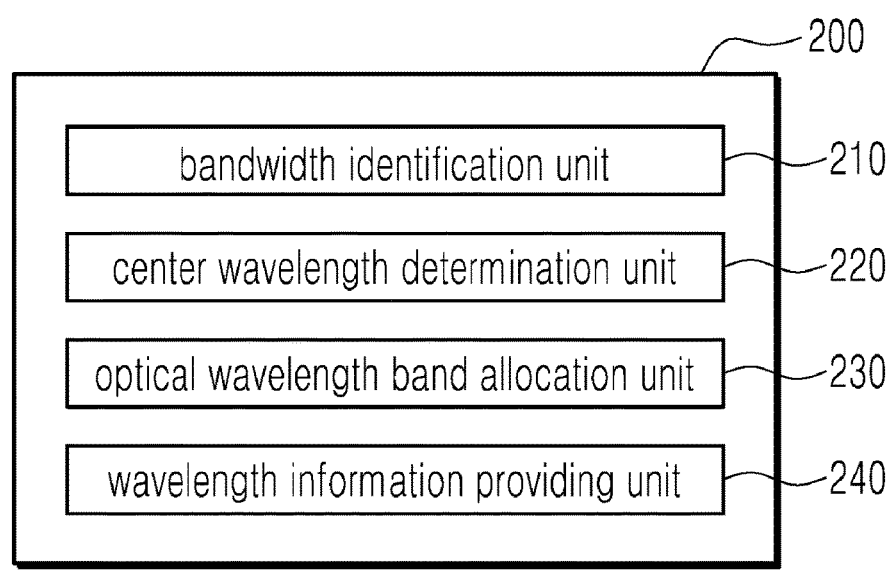
FIG. 2 is a block diagram showing a configuration of a fronthaul control device according to an embodiment of the present disclosure.

Referring to FIGS. 1 and 2, a fronthaul control device 200 according to an embodiment of the present disclosure includes: a bandwidth identification unit 210 configured to identify a frequency bandwidth of a particular cell among a plurality of cells C1-Cn according to an optical wavelength data rate required for the particular cell; a center wavelength determination unit 220 configured to determine a center wavelength for allocating the frequency bandwidth of the particular cell; and an optical wavelength band allocation unit 230 configured to allocate an optical wavelength band of the particular cell on the basis of the center wavelength and the frequency bandwidth of the particular cell.

The bandwidth identification unit 210 is configured to identify a frequency bandwidth of a particular cell among a plurality of cells C1-Cn according to an optical wavelength data rate required for the particular cell.

For convenience of explanation, the cell C2 is assumed to be a particular cell in the following description.

That is, the bandwidth identification unit 210 may be configured to receive a frequency bandwidth of the particular cell C2 calculated on the basis of off-level information of the particular cell C2 from the SON 100, when the particular cell C2 is off or when at least one of a plurality of antennas included in the particular cell C2 is off.

Then, the bandwidth identification unit 210 is configured to identify the frequency bandwidth from a frequency bandwidth of the particular cell C2 received from the SON 100.

Meanwhile, the bandwidth identification unit 210 may be configured to receive off-level information of the particular cell C2 from the SON 100, when the particular cell C2 is off or when at least one of a plurality of antennas included in the particular cell C2 is off.

Then, the bandwidth identification unit 210 may be configured to calculate an optical wavelength data rate on the basis of the off-level information of the particular cell C2, and then directly calculate a frequency bandwidth of the particular cell C2 according to the calculated optical wavelength data rate.

Then, the bandwidth identification unit 210 is configured to directly calculate a frequency bandwidth of the particular cell C2 and then identify the calculated frequency bandwidth.

Then, the bandwidth identification unit 210 may be configured to identify that a frequency bandwidth of the particular cell C2 becomes narrow when the particular cell C2 is off or when at least one of a plurality of antennas related to the particular cell C2 is off.

In other words, the bandwidth identification unit 210 may be configured to identify that a frequency bandwidth of the particular cell C2 in an OFF state becomes relatively narrower than a frequency bandwidth in a previous ON state.

The center wavelength determination unit 220 is configured to determine a center wavelength for allocating the frequency bandwidth of the particular cell C2.

Then, a center wavelength is determined such that an optical wavelength band allocated to the particular cell C2 is adjacent to an optical wavelength band allocated to at least one of remaining cells C1 and C3-Cn.

More specifically, the center wavelength determination unit 220 is configured to identify an optical wavelength band previously allocated to the plurality of cells C1-Cn for an entire optical wavelength band. The optical wavelength band may be determined by a center wavelength and a frequency bandwidth.

Then, the center wavelength determination unit 220 is configured to determine a center wavelength of the particular cell C2 to be adjacent to one optical wavelength bands allocated to respective cells C1 and C3-Cn. In this case, a frequency bandwidth of the particular cell C2 may be identified to have become relatively narrow, as described above.

Figure 3:
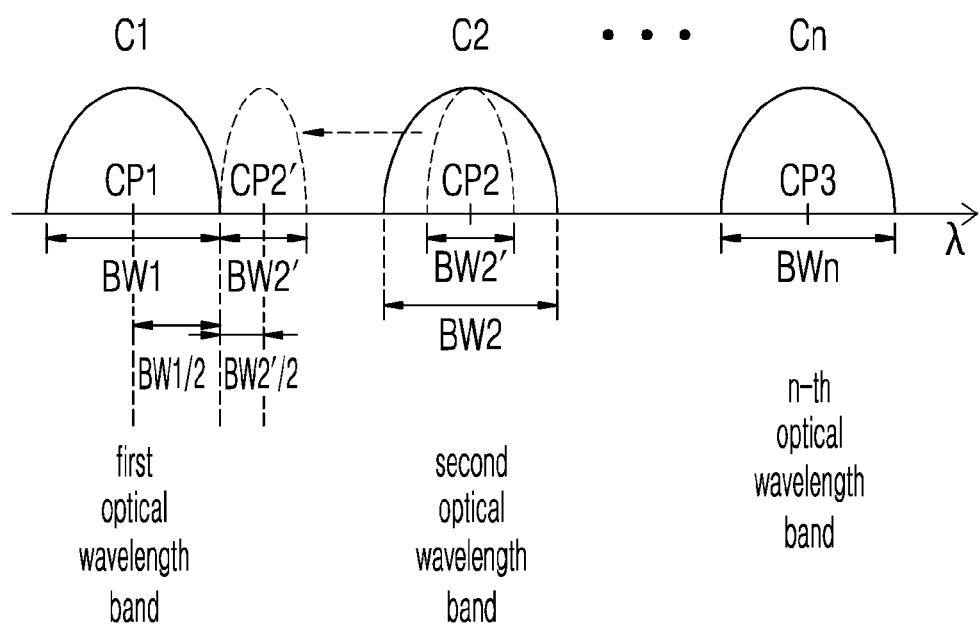
FIGS. 3 and 4 are diagrams showing embodiments for determining a center wavelength in the present disclosure.

For example, when it is assumed that optical wavelength bands are previously allocated to a plurality of cells C1-Cn as illustrated in FIG. 3, a first optical wavelength band is allocated to the cell C1, a second optical wavelength band is allocated to the cell C2, and a third to an n-th optical wavelength band are equally allocated to the remaining cells.

That is, the first optical wavelength band is determined by a center wavelength CP1 and a frequency bandwidth BW1, and the second optical wavelength band is determined by a center wavelength CP2 and a frequency bandwidth BW2. The remaining third to the n-th optical wavelength band are also determined by corresponding center wavelengths and frequency bandwidths, respectively.

Then, when a frequency bandwidth of a cell C2 becomes relatively narrow (BW2 to BW2') and the cell C2 is then determined as a particular cell C2, the center wavelength determination unit 220 determines a center wavelength CP2 of the particular cell C2 to be adjacent to one of optical wavelength bands previously allocated to respective cells C1 and C3-Cn.

For convenience of explanation, in the following description, a center wavelength of the particular cell C2 is determined to be adjacent to a first optical wavelength band allocated to the cell C1.

That is, the center wavelength determination unit 220 is configured to calculate a half frequency bandwidth BW1/2 corresponding to a half of a frequency bandwidth BW1 from a center wavelength CP1 of the cell C1. Also, the center wavelength determination unit 220 is configured to calculate a half frequency bandwidth BW2'/2 corresponding to a half of a frequency bandwidth BW2' from a center wavelength CP2 of the particular cell C2.

Then, the center wavelength determination unit 220 is configured to determine, as a center wavelength CP2', a wavelength of the particular cell C2 when the half frequency bandwidth BW1/2 of the cell C1 and the half frequency bandwidth BW2'/2 of the particular cell C2 become adjacent to each other up to a maximum allowing range in which they do not overlap and thus interference does not occur.

The center wavelength determination unit 220 may be configured to determine a center wavelength such that an optical wavelength band to be allocated to the particular cell C2 is included in an optical wavelength band allowing use of an optical amplifier, when the particular cell C2 is relatively distant from the DU pool 300 and thus a distance therebetween is equal to or greater than a predetermined value, unlike as illustrated in FIG. 1.

That is, the center wavelength determination unit 220 determines a center wavelength within a bandwidth of an optical amplifier, in a case of a fronthaul link requiring a relatively long distance transmission and a high data rate transmission. In a case of a short distance transmission and a low data rate transmission, the center wavelength determination unit 220 may determine a center wavelength out of the bandwidth of an optical amplifier.

For convenience of explanation, in the above description, it is determined that only a center wavelength of a particular cell with a frequency bandwidth becoming relatively narrow is adjacent to one of previously allocated optical wavelength bands.

Figure 4:
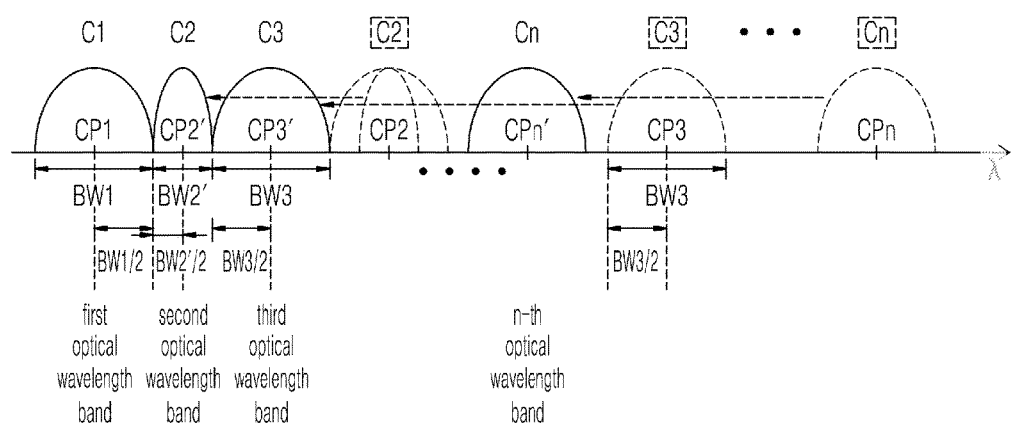

However, for another example, while a center wavelength of a particular cell is determined, center wavelengths of the remaining cells C1 and C3-Cn which are in an ON state are also newly determined, so that optical wavelength bands may be entirely re-allocated, as illustrated in FIG. 4.

More specifically, as illustrated in FIG. 4, it may be assumed that a frequency bandwidth of a cell C2 becomes relatively narrow (BW2 to BW2'), the cell C2 is then determined as a particular cell C2, and the remaining cells C1 and C3-Cn are maintained to have previously allocated frequency bandwidths BW1 and BW3-BWn.

Then, by the same method as described above, the center wavelength determination unit 220 may be configured to determine, as a center wavelength CP2', a wavelength of the particular cell C2 when the half frequency bandwidth BW1/2 of the cell C1 and the half frequency bandwidth BW2'/2 of the particular cell C2 become adjacent to each other up to a maximum allowing range in which they do not overlap and thus interference does not occur.

That is, a center wavelength of the particular cell C2 is adjusted from a center wavelength CP2 to a center wavelength CP2'.

Then, the center wavelength determination unit 220 is configured to calculate a half frequency bandwidth BW3/2 corresponding to a half of a frequency bandwidth BW3 from a center wavelength CP3 of the cell C3. Then, the center wavelength determination unit 220 is configured to determine, as a center wavelength CP3', a wavelength of the cell C3 when the half frequency bandwidth BW2'/2 of the particular cell C2 and the half frequency bandwidth BW3/2 of the cell C3 become adjacent to each other up to a maximum allowing range in which they do not overlap and thus interference does not occur.

That is, a center wavelength of the cell C3 is adjusted from a center wavelength CP3 to a center wavelength CP3'.

Then, the center wavelength determination unit 220 is configured to determine center wavelengths for allocating frequency bandwidths of the remaining cells C4-Cn by using the same method.

As described above, in the present disclosure, a center wavelength of an optical signal is not fixed, and a center wavelength of an optical signal can be flexibly adjusted for a particular cell or all cells depending on an off-state cell or an off-state MIMO antenna.

Further, in the present disclosure, a center wavelength of an optical signal is flexibly adjusted so as to changeably control an optical wavelength band allocated to each cell. Therefore, the number of actually utilizable optical wavelength bands can be increased through saving of bandwidth.

Also, referring to FIGS. 2 and 3, the optical wavelength band allocation unit 230 is configured to allocate an optical wavelength band of the particular cell on the basis of the frequency bandwidth and the center wavelength of the particular cell.

For convenience of explanation, in the following description, an optical wavelength band is allocated to the particular cell C2 such that the optical wavelength band is adjacent to a first optical wavelength band allocated to the cell C1.

That is, when a frequency bandwidth of the particular cell C2 becomes narrow (BW2 to BW2') and a center wavelength is determined from a center wavelength CP2 to a center wavelength CP2', the optical wavelength band allocation unit 230 allocates a second optical wavelength band of the particular cell C2 such that the second optical wavelength band of the particular cell C2 is adjacent to a first optical wavelength band allocated to the cell C1. In this case, the second optical wavelength band of the particular cell C2 has an identical half frequency bandwidth BW2'/2 with reference to the center wavelength CP2' of the particular cell C2.

When allocation of an optical wavelength band of a particular cell is completed, a wavelength information providing unit 240 generates wavelength allocation information for notifying of the completion of allocating an optical wavelength band of the particular cell. Then, the wavelength information providing unit 240 transmits the wavelength allocation information to a router, a fronthaul transmitter/receiver, etc. in the plurality of cells C1-Cn, so that routing can by performed.

The wavelength allocation information may include information about an optical wavelength band of a particular cell to which allocation is completed, or information about optical wavelength bands allocated to all cells.

An operation method according to an embodiment of the present disclosure will be described in detail with reference to FIGS. 5 and 6. For convenience for explanation, the following description will be made by using the reference numerals aforementioned in FIGS. 1 to 4.

Firstly, referring to FIG. 5, an operation of elements in a communication environment to which the present disclosure is applied will be explained in detail.

Figure 5:
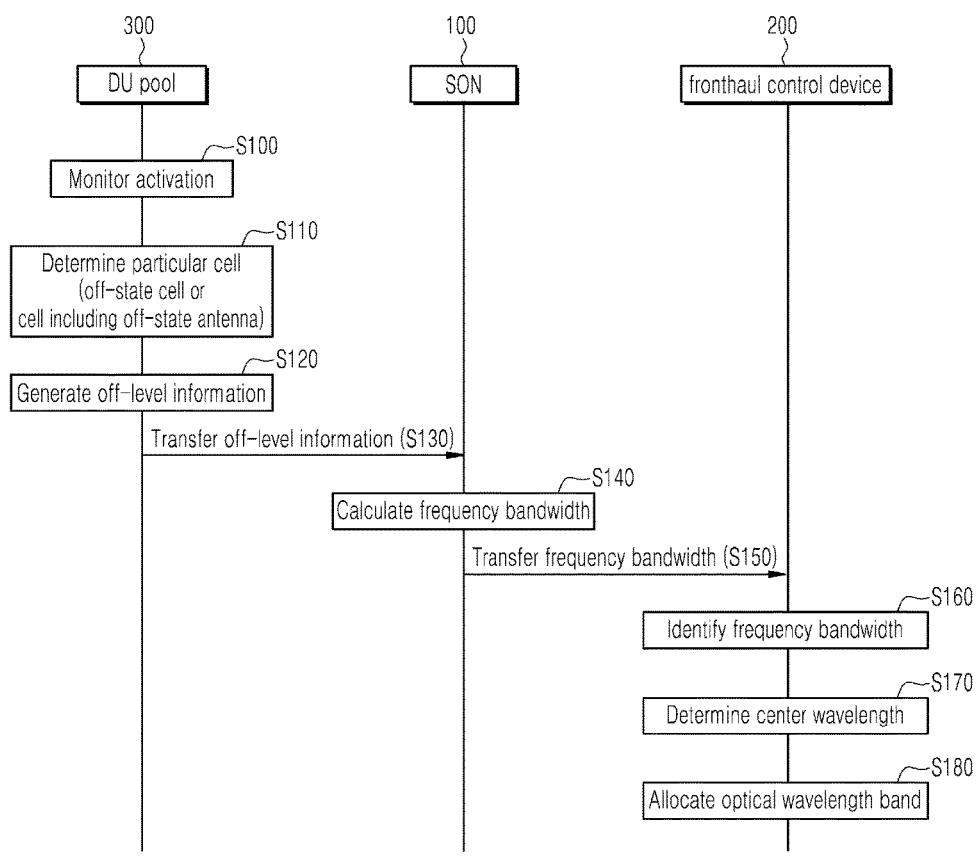
FIG. 5 is an exemplary diagram showing an operation of elements in a communication environment to which the present disclosure is applied.
Figure 6:
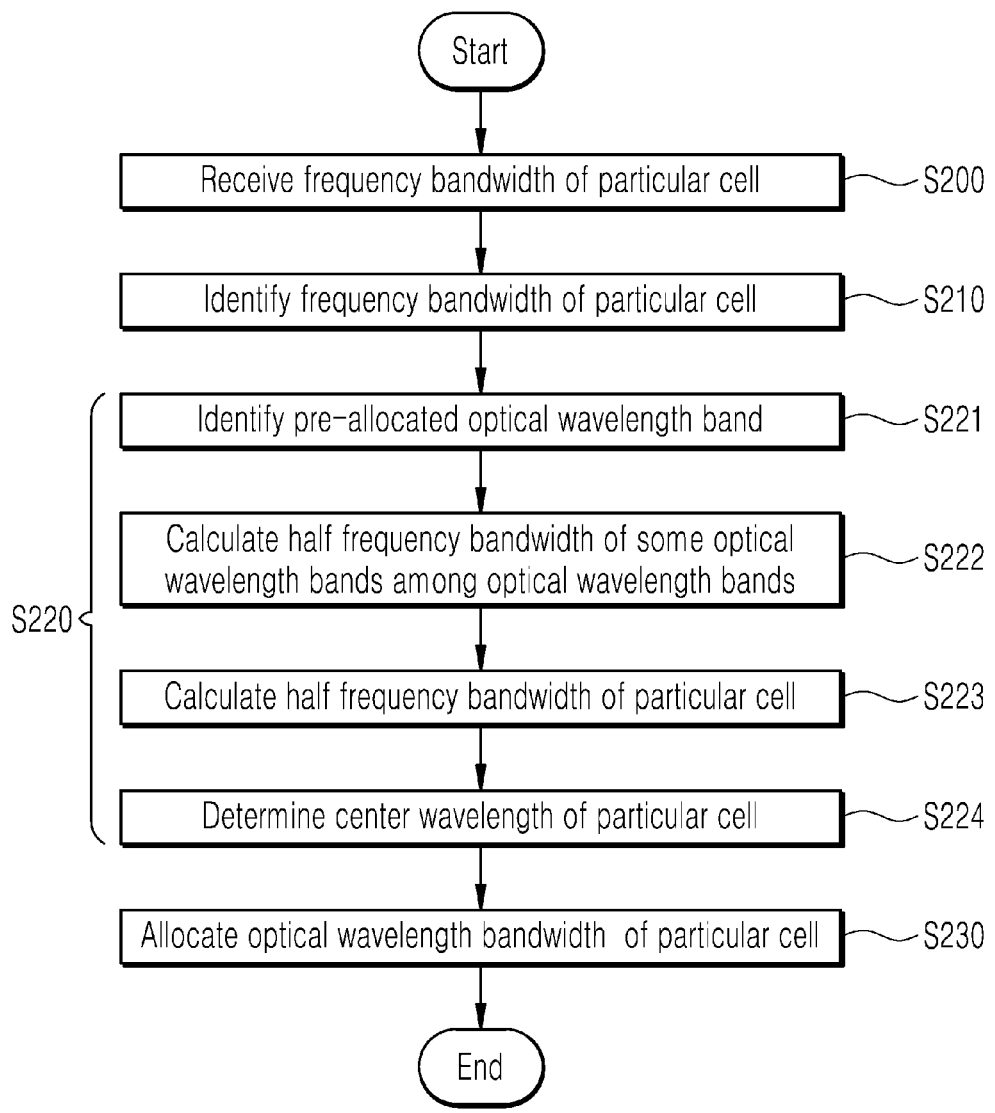
FIG. 6 is a flow diagram showing an operation method of a fronthaul control device according to an embodiment of the present disclosure.

As illustrated in FIG. 5, the DU pool 300 according to an embodiment of the present disclosure monitors an activation state of terminals included in the plurality of cells C1-Cn or an activation state of an antenna of a base station (S100).

Then, when it is determined on the basis of a result obtained by the monitoring that some cells among the plurality of cells C1-Cn are off, the DU pool 300 determines the off-state cell as a particular cell, or when it is determined that some antennas among antennas of a base station included in each cell C1-Cn are off, the DU pool 300 determines a cell including some off-state antennas, as a particular cell (S110).

More specifically, the DU pool 300 monitors an activation state of terminals included in the plurality of cells C1-Cn and then determines whether each cell C1-Cn is ON or OFF (S110).

For example, when the monitoring result indicates that an activated terminal among terminals included in the cell C2 has a value equal to or smaller than a predetermined Off-state determination threshold value, the DU pool 300 may determine the cell C2 to be in an off state.

Then, when the cell C2 is determined to be in an off state, the DU pool 300 may determine the off-state cell C2 as a particular cell.

Also, the DU pool 300 monitors an activation state of an antenna of base stations included in the plurality of cells C1-Cn and then determines whether each cell C1-Cn is ON or OFF (S110).

For example, when the monitoring result indicates that some antennas among antennas of a base station included in the cell C2 have a value equal to or smaller than a predetermined Off-state determination threshold value, the DU pool 300 may determine the cell C2 including the some off-state antennas to be in an off state.

Then, when the cell C2 is determined to be in an off state, the DU pool 300 may determine the off-state cell C2 as a particular cell.

Then, when determination of a particular cell is completed, the DU pool 300 generates off-level information on the particular cell, and then transfers the information to the SON 100 (S120 and S130).

The off-level information may be defined as information minimally required for calculating a frequency bandwidth in an OFF-state, in order to determine an optical wavelength data rate required for a particular cell.

The SON 100 receives the off-level information of the particular cell from the DU pool 300 and then determines a frequency bandwidth on the particular cell.

That is, when the SON 100 receives off-level information from the DU pool 300, the SON 100 calculates a frequency bandwidth of a particular cell according to an optical wavelength data rate required for the particular cell included in the off-level information, and then transfers the calculated frequency bandwidth to the fronthaul control device 200 (S140 and S150).

The fronthaul control device 200 identifies a frequency bandwidth of the particular cell C2 (S160).

Then, the fronthaul control device 200 may identify that a frequency bandwidth of the particular cell C2 in an OFF state becomes relatively narrower than a frequency bandwidth in a previous ON state.

The fronthaul control device 200 determines a center wavelength for allocating the frequency bandwidth of the particular cell C2 (S170).

Then, a center wavelength is determined such that an optical wavelength band allocated to the particular cell C2 is adjacent to an optical wavelength band allocated to at least one of the remaining cells C1 and C3-Cn.

More specifically, the fronthaul control device 200 identifies optical wavelength bands previously allocated to the plurality of cells C1-Cn among the entire optical wavelength band. Then, the optical wavelength band may be determined by a center wavelength and a frequency bandwidth.

Then, the fronthaul control device 200 determines a center wavelength of the particular cell C2 to be adjacent to some among optical wavelength bands allocated to respective cells C1 and C3-Cn, since a frequency bandwidth of the particular cell C2 is identified to have become relatively narrow in the above description.

For example, when it is assumed that optical wavelength bands are previously allocated to a plurality of cells C1-Cn as illustrated in FIG. 3, a first optical wavelength band is allocated to a cell C1, a second optical wavelength band is allocated to a cell C2, and a third to an n-th optical wavelength band are equally allocated to the remaining cells.

That is, the first optical wavelength band is determined by a center wavelength CP1 and a frequency bandwidth BW1, and the second optical wavelength band is determined by a center wavelength CP2 and a frequency bandwidth BW2. The remaining third to the n-th optical wavelength bands are also determined by corresponding center wavelengths and frequency bandwidths, respectively.

Then, when a frequency bandwidth of a cell C2 becomes relatively narrow (BW2 to BW2') and the cell C2 is then determined as a particular cell C2, the fronthaul control device 200 determines a center wavelength CP2 of the particular cell C2 to be adjacent to some of optical wavelength bands previously allocated to respective cells C1 and C3-Cn.

The fronthaul control device 200 may determine a center wavelength allowing an optical wavelength band included in an optical wavelength band allowing use of an optical amplifier, to be allocated to the particular cell C2, when, unlike as illustrated in FIG. 1, a distance between the particular cell C2 and the DU pool 300 is equal to or greater than a predetermined value.

Then, the fronthaul control device 200 allocates an optical wavelength band of the particular cell on the basis of the frequency bandwidth and the center wavelength of the particular cell (S180).

That is, as described above, when a frequency bandwidth of the particular cell C2 becomes narrow (BW2 to BW2') and a center wavelength is determined from a center wavelength CP2 to a center wavelength CP2', the fronthaul control device 200 allocates a second optical wavelength band of the particular cell C2 such that the second optical wavelength band of the particular cell C2 is adjacent to a first optical wavelength band allocated to the cell C1. In this case, the second optical wavelength band of the particular cell C2 has an identical width gap with reference to the center wavelength CP2' of the particular cell C2.

Next, an operation method of a fronthaul control device according to an embodiment of the present disclosure will be described in more detail with reference to FIG. 6.

When the particular cell C2 is off or when at least one of a plurality of antennas included in the particular cell C2 are off, a fronthaul control device 200 according to an embodiment of the present disclosure receives a frequency bandwidth of the particular cell C2 calculated on the basis of off-level information of the particular cell C2 from the SON 100 (S200).

Then, by comparing a frequency bandwidth of the particular cell C2, that is, a frequency bandwidth in an off state, with a frequency bandwidth in a previous ON state, the fronthaul control device 200 identifies that a frequency bandwidth of the particular cell C2 in an OFF state becomes relatively narrow (S210).

Meanwhile, the fronthaul control device 200 determines a center wavelength for allocating the frequency bandwidth of the particular cell C2 (S220).

Then, a center wavelength is determined such that an optical wavelength band allocated to the particular cell C2 is adjacent to an optical wavelength band allocated to at least one of remaining cells C1 and C3-Cn.

More specifically, the fronthaul control device 200 identifies optical wavelength bands previously allocated to the plurality of cells C1-Cn among the entire optical wavelength band (S221). Then, the optical wavelength band may be determined by a center wavelength and a frequency bandwidth.

Then, the center wavelength determination unit 220 determines a center wavelength of the particular cell C2 to be adjacent to some among optical wavelength bands allocated to respective cells C1 and C3-Cn, since a frequency bandwidth of the particular cell C2 is identified to have become relatively narrow.

For convenience of explanation, in the following description, a center wavelength of the particular cell C2 is determined to be adjacent to a first optical wavelength band allocated to the cell C1.

That is, the fronthaul control device 200 calculates a half frequency bandwidth BW1/2 corresponding to a half of a frequency bandwidth BW1 from a center wavelength CP1 of the cell C1 (S222). Also, the center wavelength determination unit 220 calculates a half frequency bandwidth BW2'/2 corresponding to a half of a frequency bandwidth BW2' from a center wavelength CP2 of the particular cell C2 (S223).

Then, the fronthaul control device 200 determines, as a center wavelength CP2', a wavelength of the particular cell C2 when the half frequency bandwidth BW1/2 of the cell C1 and the half frequency bandwidth BW2'/2 of the particular cell C2 become adjacent to each other up to a maximum allowing range in which they do not overlap and thus interference does not occur (S224).

The fronthaul control device 200 allocates an optical wavelength band of the particular cell on the basis of the frequency bandwidth BW2 and the center wavelength CP2' of the particular cell C2 (S230).

That is, as described above, when a frequency bandwidth of the particular cell C2 becomes narrow (BW2 to BW2') and a center wavelength is determined from a center wavelength CP2 to a center wavelength CP2', the fronthaul control device 200 allocates, as a second optical wavelength band of the particular cell C2, a frequency bandwidth BW2' which is adjacent to a first optical wavelength band allocated to the cell C1 and maintains an identical half frequency bandwidth BW2'/2 with reference to the center wavelength CP2' of the particular cell C2.

As described above, according to an embodiment of the present disclosure, in a state where a center wavelength of an optical signal is not fixed, a center wavelength of an optical signal is flexibly adjusted depending on an off-state cell or an off-state antenna, so that an optical wavelength band allocated to each cell can be changeably controlled.

Therefore, according to the present disclosure, a center wavelength of an optical signal is flexibly adjusted so as to changeably control an optical wavelength band. Accordingly, a bandwidth can be saved, whereby the number of optical wavelength bands which can be actually utilized in a fronthaul can be increased.

In addition, according to the present disclosure, a plurality of fronthauls for a base station can be implemented in a single optical fiber. Therefore, the present disclosure can overcome a limit of a fronthaul capacity and, further, can provide a flexible fronthaul architecture.

Embodiments of the present disclosure may be implemented by a program command type that can be performed through various computer means, and may be stored in a non-tansitory computer readable medium. The non-tansitory computer readable medium may include a program command, a data file, a data structure, and the like independently or in combination. The program command recorded in the medium may be things specially designed and configured for the present disclosure, or things that are well known to and can be used by those skilled in the computer software related art. Examples of the non-tansitory computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floptical disks, and hardware devices such as a Read-Only Memory (ROM), a Random Access Memory (RAM) and a flash memory, which are specially configured to store and perform program commands. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and the technical idea of the present disclosure covers a range in which anyone who has common knowledge in the technical field to which the present disclosure belongs can make various modifications and changes without departing from the substance of the present disclosure claimed by claims below.

What is claimed is:

1. A fronthaul control device comprising a computer configured to:
    identify a frequency bandwidth of a particular cell among a plurality of cells according to an optical wavelength data rate required for the particular cell;
    determine a center wavelength for allocating the frequency bandwidth of the particular cell; and
    allocate an optical wavelength band to the particular cell on the basis of the center wavelength and the frequency bandwidth of the particular cell,
    wherein the center wavelength is determined such that the optical wavelength band allocated to the particular cell is adjacent to an optical wavelength band allocated to at least one of other cells other than the particular cell among the plurality of cells.

2. The fronthaul control device of claim 1, wherein the computer is configured to identify that the frequency bandwidth of the particular cell becomes narrow when the particular cell is off or when at least one of a plurality of antennas related to the particular cell is off.

3. The fronthaul control device of claim 1, wherein the computer is configured to determine the center wavelength such that the optical wavelength band to be allocated to the particular cell is included in an optical wavelength band allowing use of an optical amplifier, when a distance between the particular cell and a toll center is equal to or greater than a predetermined value.

4. A non-transitory computer-readable recording medium comprising a command which read by a computer to perform:
    identifying a frequency bandwidth of a particular cell among a plurality of cells according to an optical wavelength data rate required for the particular cell;
    determining a center wavelength for allocating the frequency bandwidth of the particular cell; and
    allocating an optical wavelength band to the particular cell on the basis of the center wavelength and the frequency bandwidth of the particular cell,
    wherein the center wavelength is determined such that the optical wavelength band allocated to the particular cell is adjacent to an optical wavelength band allocated to at least one of other cells other than the particular cell among the plurality of cells.

5. The non-transitory computer-readable recording medium of claim 4, wherein the identifying comprises
    identifying that the frequency bandwidth of the particular cell becomes narrow when the particular cell is off or when at least one of a plurality of antennas related to the particular cell is off.

6. The non-transitory computer-readable recording medium of claim 4, wherein the determining comprises
    determining the center wavelength such that the optical wavelength band to be allocated to the particular cell is included in an optical wavelength band allowing use of an optical amplifier when a distance between the particular cell and a toll center is equal to or greater than a predetermined value.

7. A method performed by a fronthaul control device including a computer comprising:
    identifying a frequency bandwidth of a particular cell among a plurality of cells according to an optical wavelength data rate required for the particular cell;
    determining a center wavelength for allocating the frequency bandwidth of the particular cell; and allocating an optical wavelength band to the particular cell on the basis of the center wavelength and the frequency bandwidth of the particular cell,
wherein the center wavelength is determined such that an optical wavelength band allocated to the particular cell is adjacent to an optical wavelength band allocated to at least one of other cells other than the particular cell among the plurality of cells.

8. The method of claim 7, further comprising
identifying that the frequency bandwidth of the particular cell becomes narrow when the particular cell is off or when at least one of a plurality of antennas related to the particular cell is off.

9. The method of claim 7, further comprising
determining the center wavelength such that the optical wavelength band to be allocated to the particular cell is included in an optical wavelength band allowing use of an optical amplifier, when a distance between the particular cell and a toll center is equal to or greater than a predetermined value.

* * * * *